US010482789B2

(12) United States Patent
Escott et al.

(10) Patent No.: US 10,482,789 B2
(45) Date of Patent: Nov. 19, 2019

(54) CONTROLLABLE PROPULSIVE FORCE DEVICES INCLUDING PARAMETER ADJUSTMENTS FOR WIRELESS SMART DEVICES

(71) Applicants: Richard A. Escott, Rocklin, CA (US); Thomas Reineking, Newcastle, CA (US); Phillip Gulley, Auburn, CA (US); Scott E. Wild, Granite Bay, CA (US); Jon D. Hanks, Newcastle, CA (US); Ann D. Hanks, Newcastle, CA (US)

(72) Inventors: Richard A. Escott, Rocklin, CA (US); Thomas Reineking, Newcastle, CA (US); Phillip Gulley, Auburn, CA (US); Scott E. Wild, Granite Bay, CA (US); Jon D. Hanks, Newcastle, CA (US); Ann D. Hanks, Newcastle, CA (US)

(73) Assignee: PASCO SCIENTIFIC, Roseville, CA (US)

(*) Notice: Subject to any disclaimer, the term of this patent is extended or adjusted under 35 U.S.C. 154(b) by 196 days.

(21) Appl. No.: 15/472,100

(22) Filed: Mar. 28, 2017

(65) Prior Publication Data
US 2017/0200397 A1 Jul. 13, 2017

Related U.S. Application Data

(63) Continuation-in-part of application No. 14/988,690, filed on Jan. 5, 2016.

(51) Int. Cl.
*G09B 23/10* (2006.01)
*H04W 4/80* (2018.01)
*G01P 1/02* (2006.01)

(52) U.S. Cl.
CPC ............... *G09B 23/10* (2013.01); *G01P 1/02* (2013.01); *H04W 4/80* (2018.02)

(58) Field of Classification Search
CPC ....... G09B 23/10; G09B 19/0069; H04W 4/80; G01P 13/04; G01P 1/02; G01C 21/00; G01C 21/16; B25J 11/008; B62D 55/065
See application file for complete search history.

(56) References Cited

U.S. PATENT DOCUMENTS 4,817,000 A * 3/1989 Eberhardt ............ G05D 1/0234
180/167
8,050,863 B2 * 11/2011 Trepagnier ............ B60W 30/00
180/167

(Continued)

OTHER PUBLICATIONS

Non-final office action in U.S. Appl. No. 14/988,690 dated Sep. 27, 2018.

(Continued)

*Primary Examiner* — Harshad R Patel
*Assistant Examiner* — Nigel H Plumb
(74) *Attorney, Agent, or Firm* — Womble Bond Dickinson (US) LLP

(57) ABSTRACT

Described herein are propulsive force devices for providing propulsive force to integrated wireless devices for science education (e.g., Newton's laws of motion, kinematics, etc.). A propulsive force device includes a motor to drive a rotating member to generate a propulsive force and a motor driver coupled to the motor. The motor driver controls operation of the motor and at least one processing unit is coupled to the motor driver. The at least one processing unit is configured to receive a control signal from an integrated wireless device to adjust at least one parameter of the propulsive force device. When the propulsive force device is mounted to an integrated wireless device, operation of the propulsive force device may be configured to alter, adjust, or otherwise change dynamic properties of the integrated wireless device during science education experiments.

11 Claims, 15 Drawing Sheets

(56) References Cited

U.S. PATENT DOCUMENTS

| | | | |
|---|---|---|---|
| 8,651,206 B2* | 2/2014 | Slawinski | B60L 15/40 180/167 |
| 9,283,681 B2 | 3/2016 | Slawinski | |
| 2015/0192435 A1 | 7/2015 | Kurpan | |
| 2015/0343644 A1* | 12/2015 | Slawinski | B25J 11/008 701/2 |

OTHER PUBLICATIONS

Vernier. (Sep. 4, 2014). New fan cart for physics. Vernier Software and Technology. Retrieved from http://www.vernier.com/news/2014/09/04/new-fan-cart-for-physics/.

* cited by examiner

CONTROLLABLE PROPULSIVE FORCE DEVICES INCLUDING PARAMETER ADJUSTMENTS FOR WIRELESS SMART DEVICES

RELATED APPLICATIONS

This application is a continuation-in-part of U.S. application Ser. No. 14/988,690, filed on Jan. 5, 2016, entitled WIRELESS SMART DEVICES HAVING INTEGRATED FORCE, POSITION, ACCELERATION, AND ROTATIONAL SENSING FOR SCIENCE EDUCATION, the entire contents of which is hereby incorporated by reference.

TECHNICAL FIELD

Embodiments of the present invention relate to controllable propulsive force devices for positioning of wireless integrated devices having integrated force, position, acceleration, and rotational sensing for science education.

BACKGROUND

Science educators present learning material such as science experiments or laboratories with wheeled carts to teach students the principals of Newton's $2^{nd}$ and $3^{rd}$ laws of motion. These experiments use either external position and force sensors or a combination of an internal position sensor and an external force sensor to measure Cart dynamics in lab experiments. Cart acceleration is inferred by calculating the second derivative of position which causes loss of accuracy. The use of a grooved track is required to ensure physical alignment of the cart with an external force sensor. No practical means exists to measure a slope of the cart in movement.

SUMMARY

Described herein are propulsive force devices for providing propulsive force to integrated wireless devices for science education (e.g., Newton's laws of motion, kinematics, etc.). A propulsive force device includes a motor to drive a rotating member to generate a propulsive force and a motor driver coupled to the motor. The motor driver controls operation of the motor and at least one processing unit is coupled to the motor driver. The at least one processing unit is configured to receive a control signal from an integrated wireless device to adjust at least one parameter of the propulsive force device and to provide a control signal to the motor driver to control operation of the motor driver including adjustment of the at least one parameter.

BRIEF DESCRIPTION OF THE DRAWINGS

The present invention is illustrated by way of example, and not by way of limitation, in the figures of the accompanying drawings and in which.

DETAILED DESCRIPTION

Figure 1:
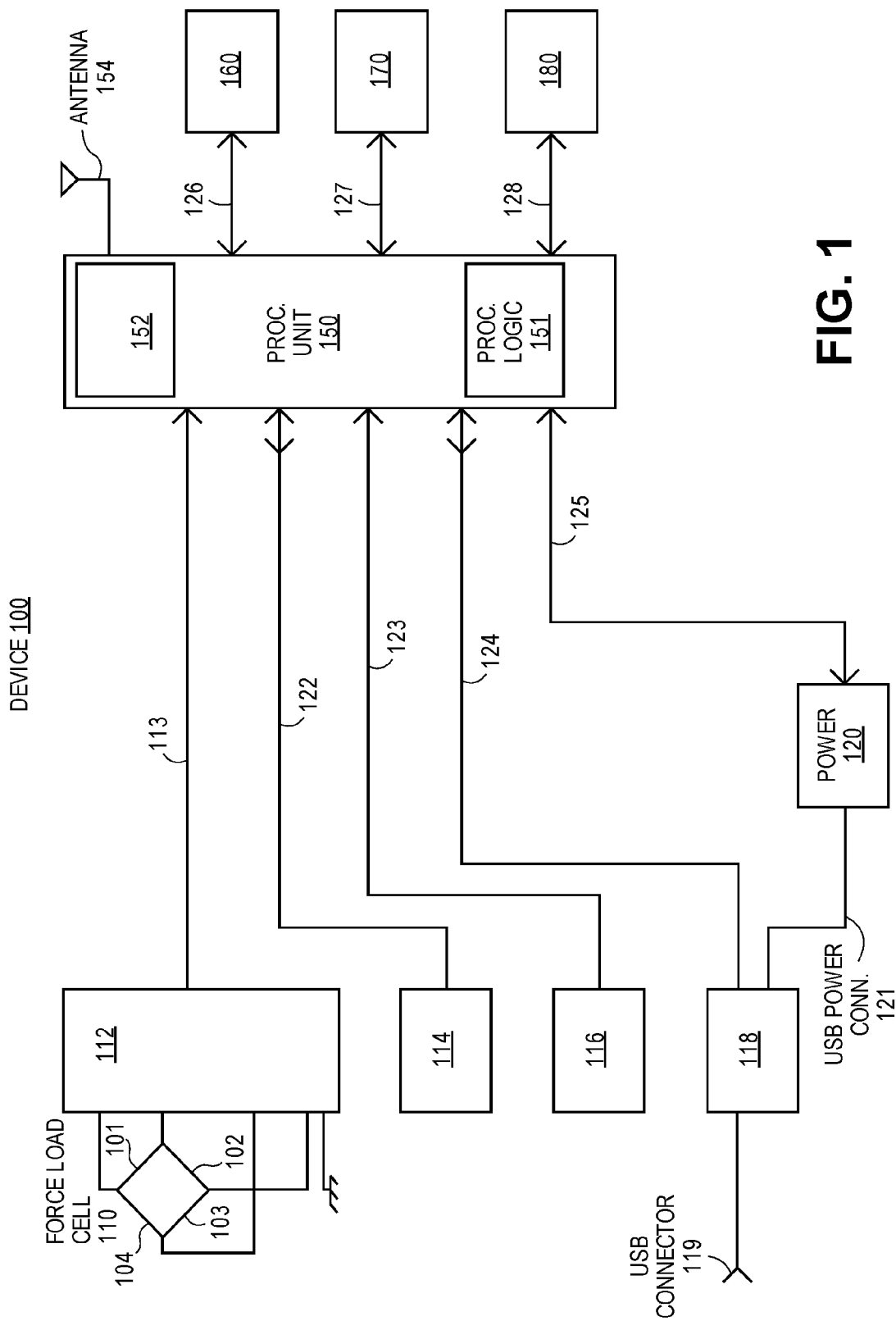
FIG. 1 illustrates a block diagram of a wireless device having integrated force, position, acceleration, and rotational sensing according to one embodiment.

Described herein are wireless smart devices having integrated force, position, acceleration, and rotational sensing for science education (e.g., Newton's laws of motion, kinematics, etc.). All sensors (e.g., position, force, acceleration) are physically integrated into a wireless smart device (e.g., cart, levitating device, etc.) and wireless communication, battery powered device, and no wires are used during a science experiment for demonstrating Newton's laws of motion. Also, no external interface is needed for communications between the integrated wireless device and a computer or another wireless device (e.g., mobile device, tablet device, etc.) that is operating data capture, analysis, and display software for the science experiment.

Also described herein are propulsive force devices for providing a controlled propulsive force from air flow and maintaining the force constant for a given setting. The propulsive force device can be connected to integrated wireless smart devices for science education (e.g., Newton's laws of motion, kinematics, etc.). A propulsive force device includes a motor to drive a rotating member to generate a propulsive force and a motor driver coupled to the motor. The motor driver controls operation of the motor and at least one processing unit is coupled to the motor driver. The at least one processing unit is configured to receive a control signal from an integrated wireless smart device to adjust at least one parameter of the propulsive force device and to provide a control signal to the motor driver to control operation of the motor driver including adjustment of the at least one parameter.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Embodiments of present design enable students to easily and accurately measure the dynamic properties of devices (e.g., bodies, carts) in motion (e.g., linear motion) including positon, velocity, acceleration, slope angle, and applied or impact force.

Wheeled Carts are commonly used in Physics lab experiments to teach students the principles of Newton's $2^{nd}$ and $3^{rd}$ laws of motion. Prior to embodiments of this invention it has been necessary to either use external position and force sensors or a combination of an internal position sensor and an external force sensor to measure Cart dynamics in lab experiments. Cart acceleration was inferred by calculating the second derivative of position, causing loss of accuracy. The use of a grooved track was required to ensure physical alignment of the cart with an external force sensor. No practical means existed to measure slope of the cart in movement. Optional Cart accessories, including fan propulsion, impulse plunger trigger and ball drop apparatus require manual control which compromise experimental data accuracy.

The present design solves the problem of simultaneously measuring motion, force, linear acceleration and slope with high accuracy and time synchronization from within a dynamics Cart. Data is transmitted using wireless RF (e.g., Bluetooth) communication to an external computer for data collection, analysis and display. Wireless communication eliminates the adverse effect of wired connection to a moving cart. Acceleration is directly measured inside the Cart rather than inferred through calculation of the second derivative of position, which yields higher accuracy. Slope is directly measured within the Cart using a gyroscope. Cost is greatly reduced through elimination of multiple internal and external sensors and interface electronics.

The integrated wireless device (e.g., Smart Cart having weight of 200-300 grams) in one example incorporates four wheels on solid axles with low-friction ball bearings to minimize rolling resistance. In one example, a shaft encoder on the rear axle and a quadrature decoder in the body (or at least one processing unit) are used together to precisely measure forward and backward Cart position over time. Linear acceleration is measured directly using an integrated three-axis (x,y,z) MEMs accelerometer. Cart slope is measured using an integrated MEMs gyroscope physically aligned with the accelerometer. An integrated load cell is used to measure externally applied or impact forces. All sensor measurements are time synchronized by a central microprocessor and then transmitted over a Bluetooth wireless link to an external computer for recording, analysis and display. At least one processing unit or a central microprocessor communicate through an electrical connector to control optional accessories.

In one embodiment, the Smart Cart contains a force load cell, a 6-axis accelerometer/gyroscope, optical shaft encoder with built-in decoder, microprocessor for the Bluetooth Smart radio and control, rechargeable Lithium Polymer battery with built-in charger, USB connection for battery charging and firmware upgrades, a manually or electronically activated spring loaded plunger for impulse action, and an electrical connector for accessory attachments.

FIG. 1 illustrates a block diagram of a wireless device having integrated force, position, acceleration, and rotational sensing according to one embodiment. This device 100 may include a processing unit 150 (e.g., microprocessor) having a RF communication module 152 (e.g., Bluetooth, WiFi, Zigbee, etc.) with antenna 154 and also a processing unit 118 (e.g., USB microprocessor). The device includes a force load cell 110 (e.g., strain gauge, hydraulic, pneumatic, etc.) that creates an electrical signal having a magnitude that is directly proportional to a force (e.g., +/−100 Newtons) being measured. In one example, the force load cell 110 is a strain gauge load cell having strain gauges 101-104 which are configured in a Wheatstone bridge configuration (e.g., 1 K ohm). The electrical signal output by the force load cell 110 is typically small (e.g., a few millivolts (mV), 2.3 mV/V with +/−0.23 mV/V) and is amplified by an amplifier of amplifier unit 112 to generate an amplified signal (e.g., 0.737 V with +/−0.735 V nominal). This unit 112 may also include a level shifter and a filter. This unit 112 generates an output signal that is sent to the processing unit 150 via a connection 113 (e.g., communication link, bus, signal line, electrical connection, etc.).

A motion unit 114 detects acceleration and rotational data. In one example, the motion unit 114 includes a 3-axis MEMs accelerometer for determining acceleration data in 3 dimensions and also a 3-axis MEMs gyroscope for determining rotational data in 3 dimensions that can be used for determining a slope of movement of the wireless device 100. The gyroscope can be physically aligned with the accelerometer. The motion unit 114 communicates with the processing unit 150 via the bi-directional connection 122 (e.g., communication link, bus, signal line, electrical connection, etc.). For example, acceleration and rotation data can be sent to the processing unit 150.

A shaft encoder 116, (e.g., a mechanical encoder, an optical shaft encoder, etc.) may be positioned in proximity to an axle or shaft of the wireless device 100. The encoder 116 converts angular position of an axle or shaft that is coupled to a wheel into an analog or digital code. The processing unit 150 or a built-in decoder (e.g., quadrature decoder located in a body of the wireless device) then determines positional data of the wireless device 100. The encoder 116 communicates with the processing unit 150 via the bi-directional connection 123 (e.g., communication link, bus, signal line, electrical connection, etc.).

A processing unit 118 (e.g., USB microprocessor) is coupled to a USB connector 119 and a power module 120 (e.g., battery, charger, power supplies) that can provide USB power to the processing unit 118 via power connection 121. The power module 120 is coupled to the processing unit 150 via a bi-directional connection 125 and the processing unit 118 is coupled to the processing unit 125 via a bi-directional connection 124. The power module 120 provides power to the processing unit 150, which may have a different power supply (e.g., 3.3 volts) than the processing unit 118. The power module 120 may include a lithium polymer battery in combination with standard electronics that monitor the battery charge and prevent it from dropping below a critical level. In one example, a USB connection to the processing unit 118 performs an update of firmware of the device 100 in a faster manner than using a wireless connection of the RF communication module 152 for performing the update of firmware.

The processing unit 150 is coupled to a module 160, accessory port(s) 170, and memory 180 via bi-directional connections 126-128. The module 160 includes LEDs and power for illuminating different components (e.g., cart lights) of the device 100. The accessory port(s) 170 can be coupled to different types of accessories (e.g., fan propulsion, impulse plunger trigger, ball drop/projector apparatus). The memory 180 (e.g., flash memory) stores data and software instructions for the processing unit 150.

The memory 180 may include a machine-accessible storage medium having one or more sets of instructions (e.g., software) embodying any one or more of the methodologies or functions described herein. The software may also reside, completely or at least partially, within the memory 180 and/or within the processing unit 150 or 118 during execution thereof by the device 100, the memory 180 and the processing unit 150 also constituting machine-accessible storage media.

While the memory 180 (e.g., machine-accessible storage medium) is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

The processing units 118 and 150 represent one or more general-purpose processing devices such as a processing system, central processing system, or the like. More particularly, the processing units 118 and 150 may be a complex instruction set computing (CISC) processing system, reduced instruction set computing (RISC) processing system, very long instruction word (VLIW) processing system, or a processor implementing other instruction sets or processors implementing a combination of instruction sets. The processing units 118 and 150 may also be one or more special-purpose processing devices such as an application specific integrated circuit (ASIC), a field programmable gate array (FPGA), a digital signal processor (DSP), network processor, or the like. The processing unit 150 may be configured to execute the processing logic 151 for performing the operations and steps discussed herein.

In an alternative embodiment, the device 100 includes a force load cell for detecting force and a motion unit for detecting acceleration and rotational data. The device may not include a shaft encoder though and this device can be attached to any type of apparatus even apparatuses having no axles.

Figure 2:
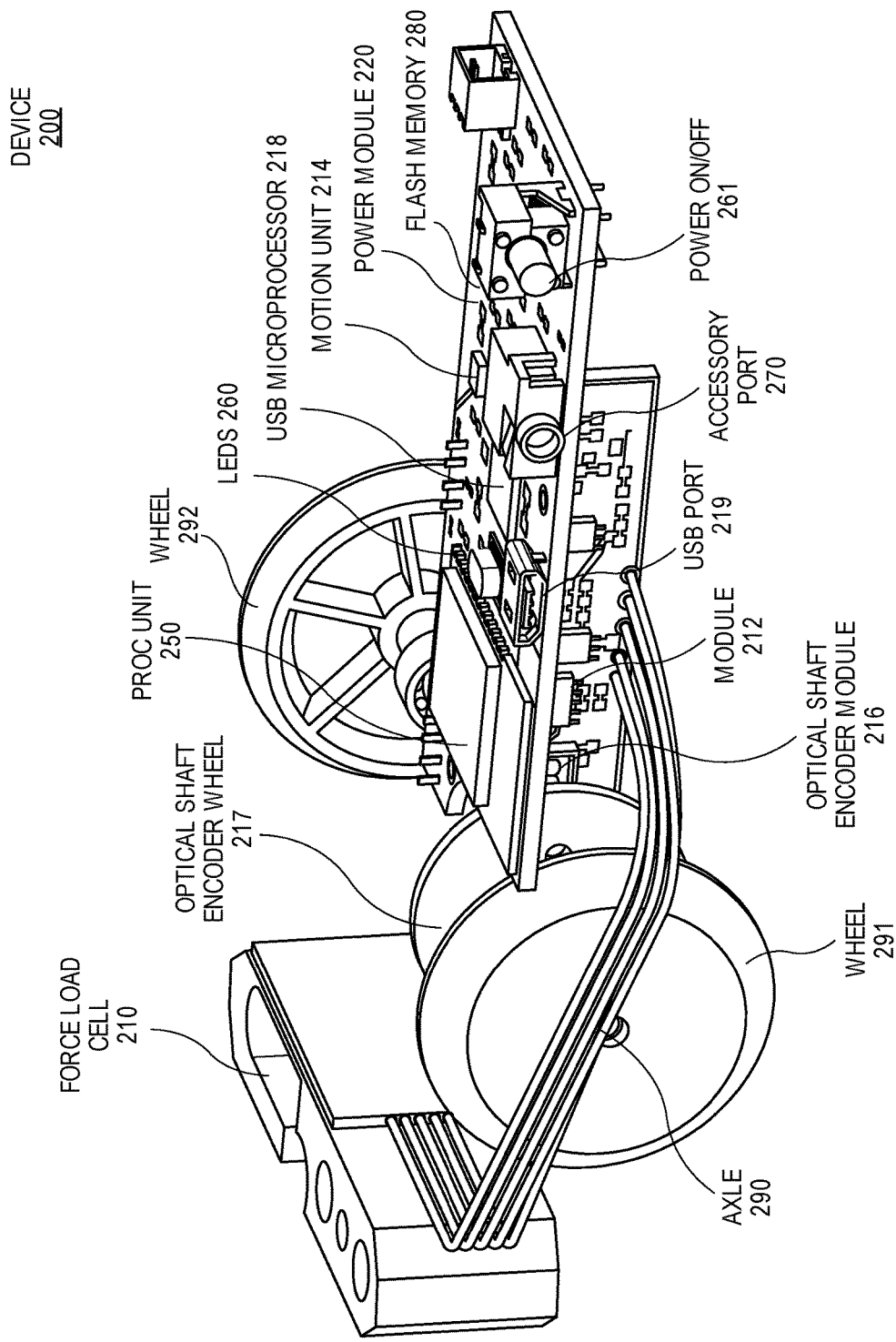
FIG. 2 illustrates components of a wireless device in accordance with one embodiment.

FIG. 2 illustrates components of a wireless device in accordance with one embodiment. The device 200 is illustrated with wheels 291-292 and no body or enclosure for purpose of illustrating internal components of the device. The device 200 includes similar components in comparison to the components described in conjunction with FIG. 1. The device 200 includes a force load cell 210, a shaft encoder module 216 (e.g., shaft encoder 116), a shaft encoder wheel 217 (e.g., optical shaft encoder wheel), a processing unit 250, LEDs 260, a USB microprocessor 218, a motion unit 214 having a 3-axis accelerometer and a 3-axis gyroscope, power supply module 220, flash memory 280, power on/off component 261, accessory port(s) 270, USB port 219, a module 212 having an amplifier, level shifter, and filter, and axle 290 that rotates to turn the wheels 290-291 and 217. The optical shaft encoder 216 uses optical sensor(s) to monitor motion of the wheel 217 to determine a position of the device 200. The device 200 may include additional wheels or fewer wheels having low bearing friction. In another example, the device may levitate above a track or surface and have no wheels.

Figure 3:
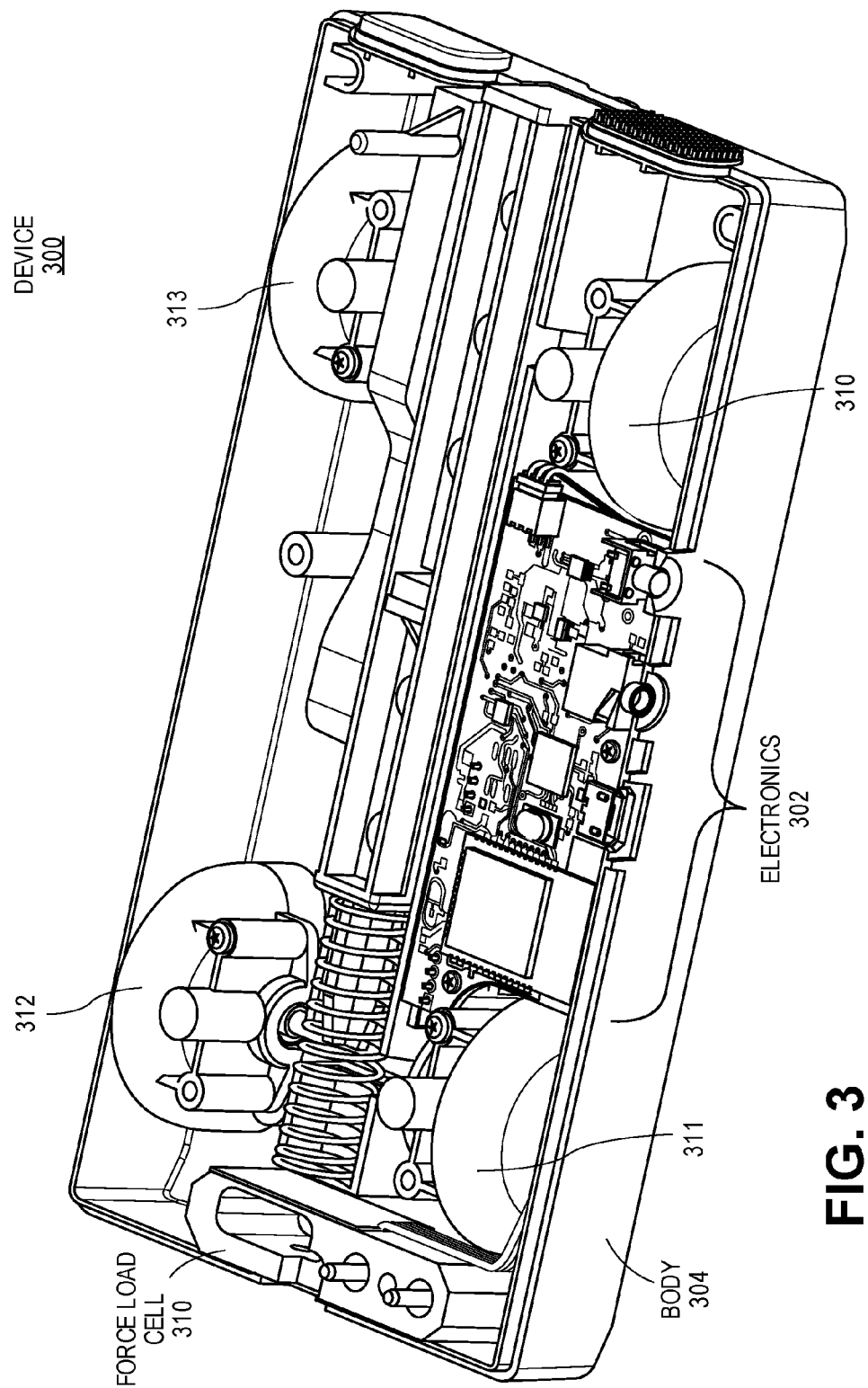
FIG. 3 illustrates a body that contains components of a wireless device in accordance with one embodiment.

FIG. 3 illustrates a body that contains components of a wireless device in accordance with one embodiment. The device 300 is illustrated with wheel housings 310-313 within a body 304. The device 300 includes similar components in comparison to the components described in conjunction with FIGS. 1-2. The device 300 includes a force load cell 310 and an electronics region 302 having different components (e.g., a shaft encoder module, a processing unit, LEDs, a USB microprocessor, a motion unit having a 3-axis accelerometer and a 3-axis gyroscope, power supply module, flash memory, a module 212 having an amplifier, level shifter, and filter). The device 300 may include additional wheels or fewer wheels. In another example, the device may levitate above a track or surface and have no wheels.

Figure 4:
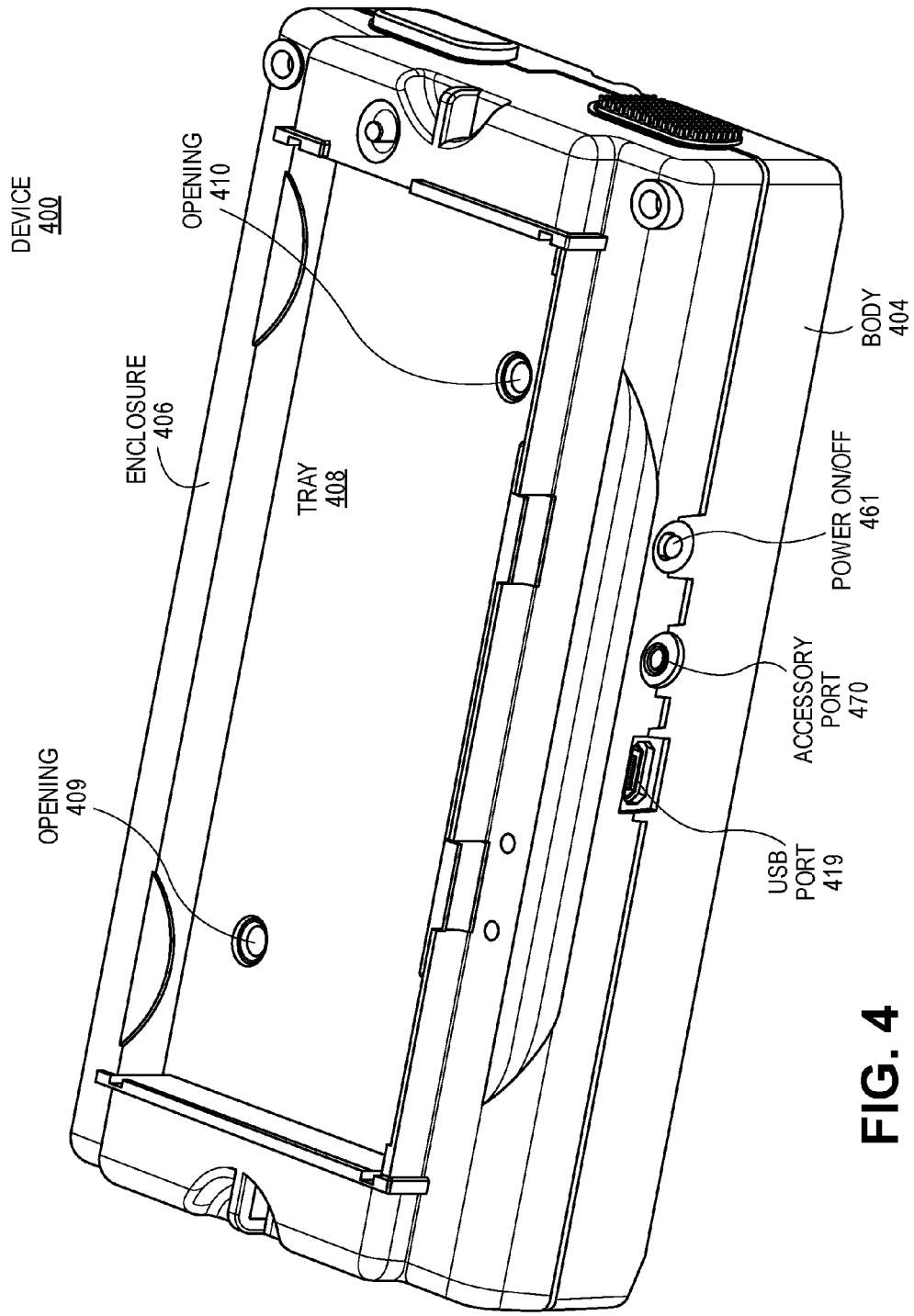
FIG. 4 illustrates an upper view of a body and an enclosure of a wireless device in accordance with one embodiment.

FIG. 4 illustrates an upper view of a body and an enclosure of a wireless device in accordance with one embodiment. The device 400 is illustrated with a body 404 and an enclosure 406 that protects the components of the wireless device (e.g., device 100, device 200, device 300). The device 400 includes similar components in comparison to the components described in conjunction with FIGS. 1-3. The device 400 includes a USB port 419, accessory port(s) 470, and power ON/OFF 461. An upper region of the enclosure 406 includes a tray 408 having openings 409 and 410. The tray can be used for supporting and positioning one or more accessories. The tray can also be used for supporting additional masses if desired for increasing a mass of the wireless device.

Figure 5:
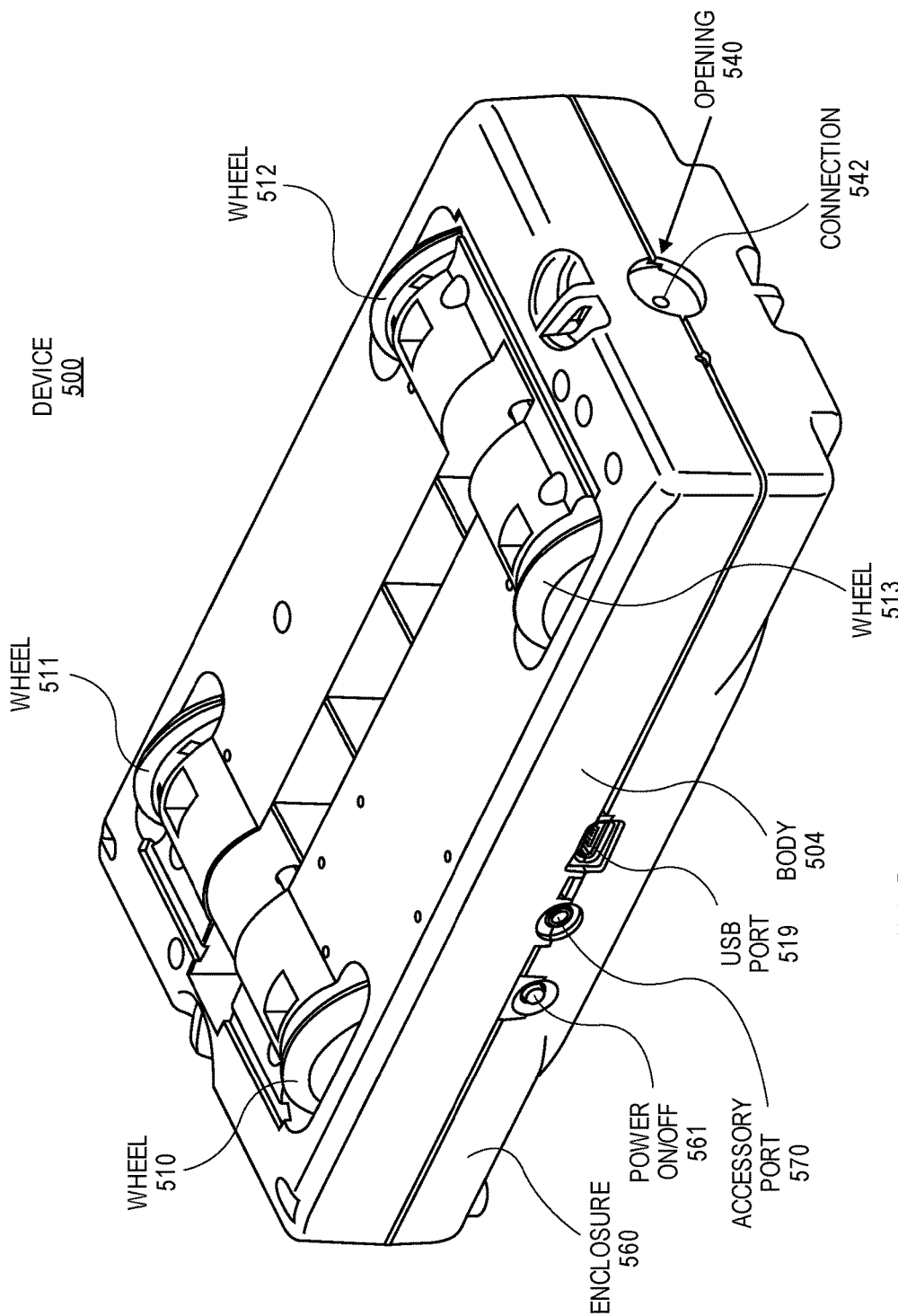
FIG. 5 illustrates a lower view of a body and an enclosure of a wireless device in accordance with one embodiment.

FIG. 5 illustrates a lower view of a body and an enclosure of a wireless device in accordance with one embodiment. The device 500 is illustrated with a body 504 and an enclosure 560 that protects the components of the wireless device (e.g., device 100, device 200, device 300). The device 500 includes similar components in comparison to the components described in conjunction with FIGS. 1-4. The device 500 includes a USB port 519, accessory port(s) 570, power ON/OFF 561. A lower region of the body 504 includes openings for wheels 510-513 of the device 500.

The enclosure and body include an opening 540 for accessing a connection 542 to a force load cell. Accessories or components (e.g., hook, bumper, spring, magnets, etc.) can then be connected to the force load cell using the connection 542. In one example, the connection 542 includes a screw hole for connecting to the force load cell.

Figure 6:
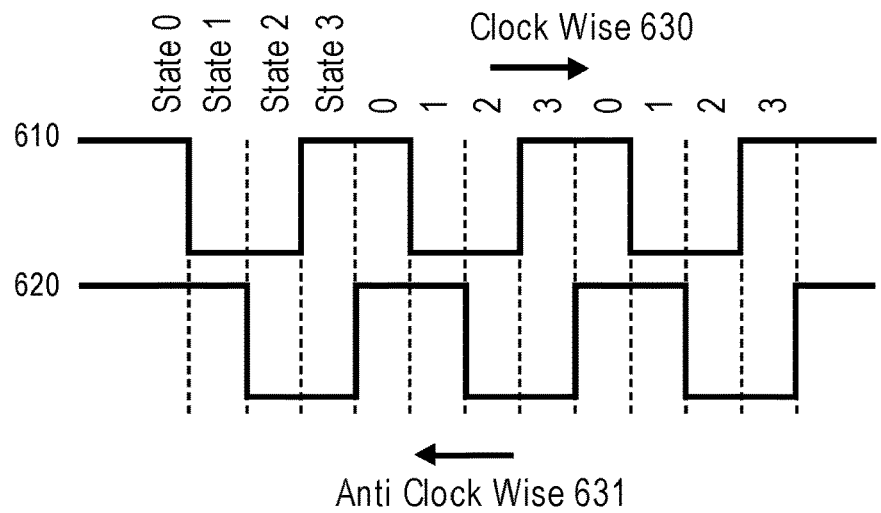
FIG. 6 illustrates a timing diagram for decoding of inputs providing by an encoder in accordance with one embodiment.

FIG. 6 illustrates a timing diagram for decoding of inputs providing by an encoder in accordance with one embodiment. An encoder (e.g., encoder 116, 216) provides signals 610 and 620 that are generated based on when the encoder is rotating. The signals 610 and 620 are quadrature outputs of the encoder due to being 90 degrees out of phase. In one example, optical sensors monitor motion of the wireless device (e.g., a wheel 217). A processing unit or decoder assigns states 0-3 to different regions of the signals 610 and 620. In one example, each state change increments a counter (clock wise 630) or decrements a counter (counter clock wise 631) as illustrated in FIG. 6. In one example, each count equals approximately a 0.07 mm position change of a cart.

Figure 7:
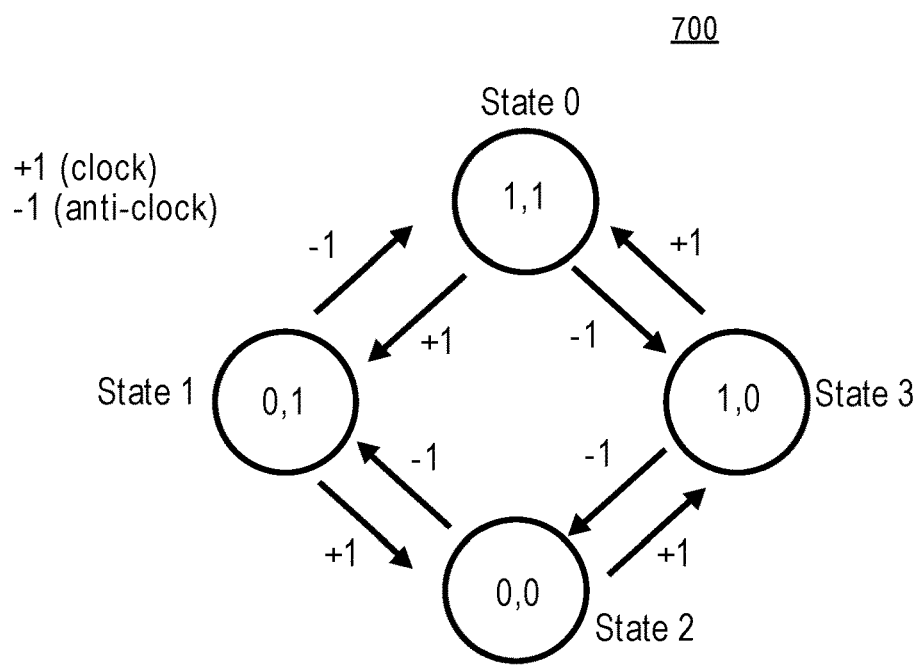
FIG. 7 illustrates an incremental rotary encoder state machine in accordance with one embodiment.

FIG. 7 illustrates an incremental rotary encoder state machine in accordance with one embodiment. A state machine 700 includes states 0-3. The signals 610 and 620 are decoded to generate a count up pulse or a count down pulse. A state change of +1 indicates motion in a clockwise direction and a state change of −1 indicates motion in a counter clockwise direction. The incremental rotary encoder state machine allows accurate determination of wireless device position independent of an external surface or track.

Figure 8:
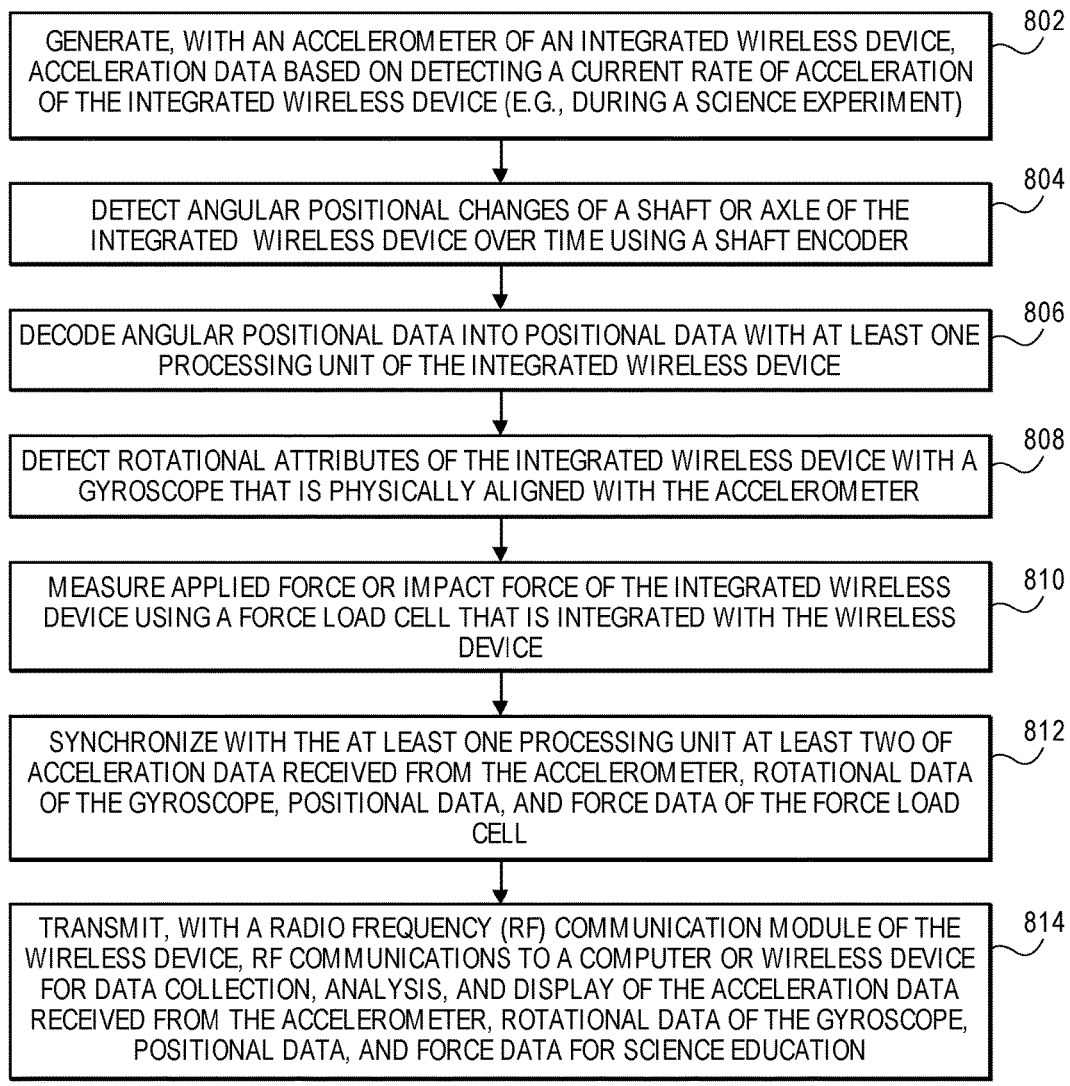
FIG. 8 illustrates a flow diagram of one embodiment for a method 800 of performing dynamics experiments.

FIG. 8 illustrates a flow diagram of one embodiment for a method 800 of performing dynamics experiments. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic of at least one wireless device (e.g., cart, vehicle, levitating device, drone, self-guided device, self-propelled device, etc). The wireless device executes instructions of a software application or program with processing logic. In one example, the integrated wireless device performs some or all of the operations of the method 800.

At operation 802, the method includes generating, with an accelerometer of an integrated wireless device, acceleration data based on detecting a current rate of acceleration of the integrated wireless device (e.g., during a science experiment). At operation 804, the method includes detecting angular positional changes of a shaft or axle of the integrated wireless device over time using a shaft encoder. At operation 806, the method includes decoding angular positional data into positional data with at least one processing unit of the integrated wireless device. In one example, the shaft encoder is positioned in proximity to the shaft or axle of the integrated wireless device.

At operation 808, the method further includes detecting rotational attributes of the integrated wireless device with a gyroscope that is physically aligned with the accelerometer. At operation 810, the method further includes measuring applied force or impact force of the integrated wireless device using a force load cell that is integrated with the wireless device. At operation 812, the method further includes synchronizing with the at least one processing unit at least two of acceleration data received from the accelerometer, rotational data of the gyroscope, positional data, and force data of the force load cell. At operation 814, the method further includes transmitting, with a radio frequency (RF) communication module of the wireless device, RF communications to a computer or wireless device for data collection, analysis, and display of the acceleration data received from the accelerometer, rotational data of the gyroscope, positional data, and force data for science education.

In one embodiment, the processing logic (e.g., at least one processing unit) of the integrated wireless device determines direct synchronous measurement of position and acceleration of the wireless device. No track is required for position measurements in contrast to prior approaches with carts. A slope of the wireless device is measured electronically with a gyroscope. Applied or impact force can be measured for a single device (e.g., cart) or for multiple colliding devices (e.g., carts).

The integrated wireless device (e.g., Smart Cart) has an external accessory port (e.g., jack) for external connection to accessories such as a propulsive force device (e.g., Smart Fan Accessory), an Impulse Plunger Trigger, or a Ball Drop/Projector Apparatus. These accessories expand the Smart Cart's use in studying Newton's Laws and other physics principles.

The propulsive force device (e.g., Smart Fan Accessory (SFA)) provides a controlled propulsive force from air flow and keeps the force constant for a given setting. The SFA mounts to the top of a Smart Cart, a Dynamics Cart, or similar vehicles. The SFA has two modes of operation depending upon which cart it is mounted.

Figure 9:
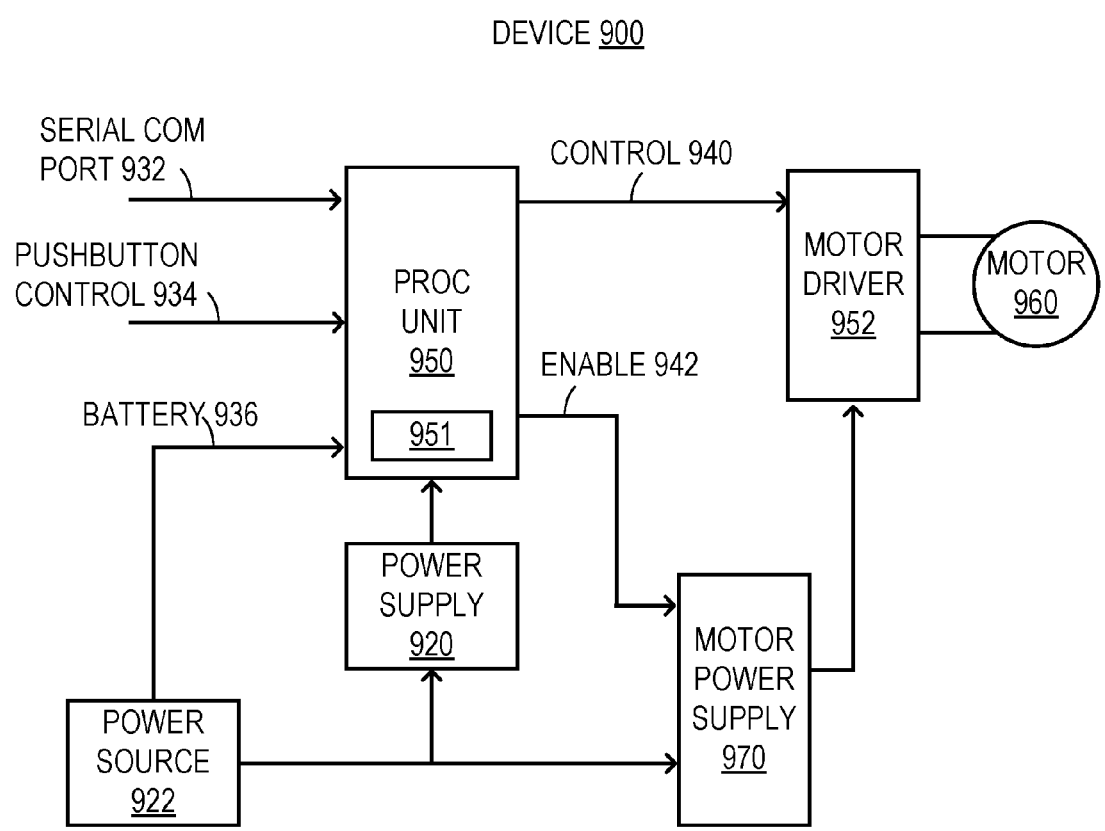
FIG. 9 illustrates a block diagram of a propulsive force device (e.g., Smart Fan Accessory (SFA)) according to one embodiment.

FIG. 9 illustrates a block diagram of a propulsive force device (e.g., Smart Fan Accessory (SFA)) according to one embodiment. This device 900 may include a processing unit 950 (e.g., microprocessor) and a power supply 920 for supplying power to the processing unit 950. A power source 922 (e.g., battery power source) is coupled to the processing unit 950 with a low battery signal 936 if asserted indicating a low battery condition. The power source 922 is also coupled to the power supply 920 and a motor power supply 970 for supplying power for a motor driver 952. The processing unit 950 includes a serial communication port 932 to connect with an external accessory port 170 of the integrated wireless device 100. The processing unit 950 provides a control signal 940 to the motor driver 952 to control operation of the motor driver 952, which controls operation of the motor 960 that controls a force applied to a rotating member (e.g., fan) for generating a propulsive force. The processing unit 950 also provides an enable signal 942 for enabling the motor power supply 970.

The processing unit 950 may include a push button control 934 for manual operation of the device 900. The processing unit 950 represents one or more general-purpose processing devices such as a processing system, central processing system, or the like. More particularly, the processing unit 950 may be a complex instruction set computing (CISC) processing system, reduced instruction set computing (RISC) processing system, very long instruction word (VLIW) processing system, or a processor implementing other instruction sets or processors implementing a combination of instruction sets. The processing unit 950 may also be one or more special-purpose processing devices such as an application specific integrated circuit (ASIC), a field programmable gate array (FPGA), a digital signal processor (DSP), network processor, or the like. The processing unit 950 may be configured to execute the processing logic 951 for performing the operations and steps discussed herein.

A first mode of operation has the SFA mounted on a Smart Cart. A science software application controls the SFA through the Smart Cart. When the SFA is plugged into the Smart Cart the application automatically recognizes the SFA.

Figure 10:
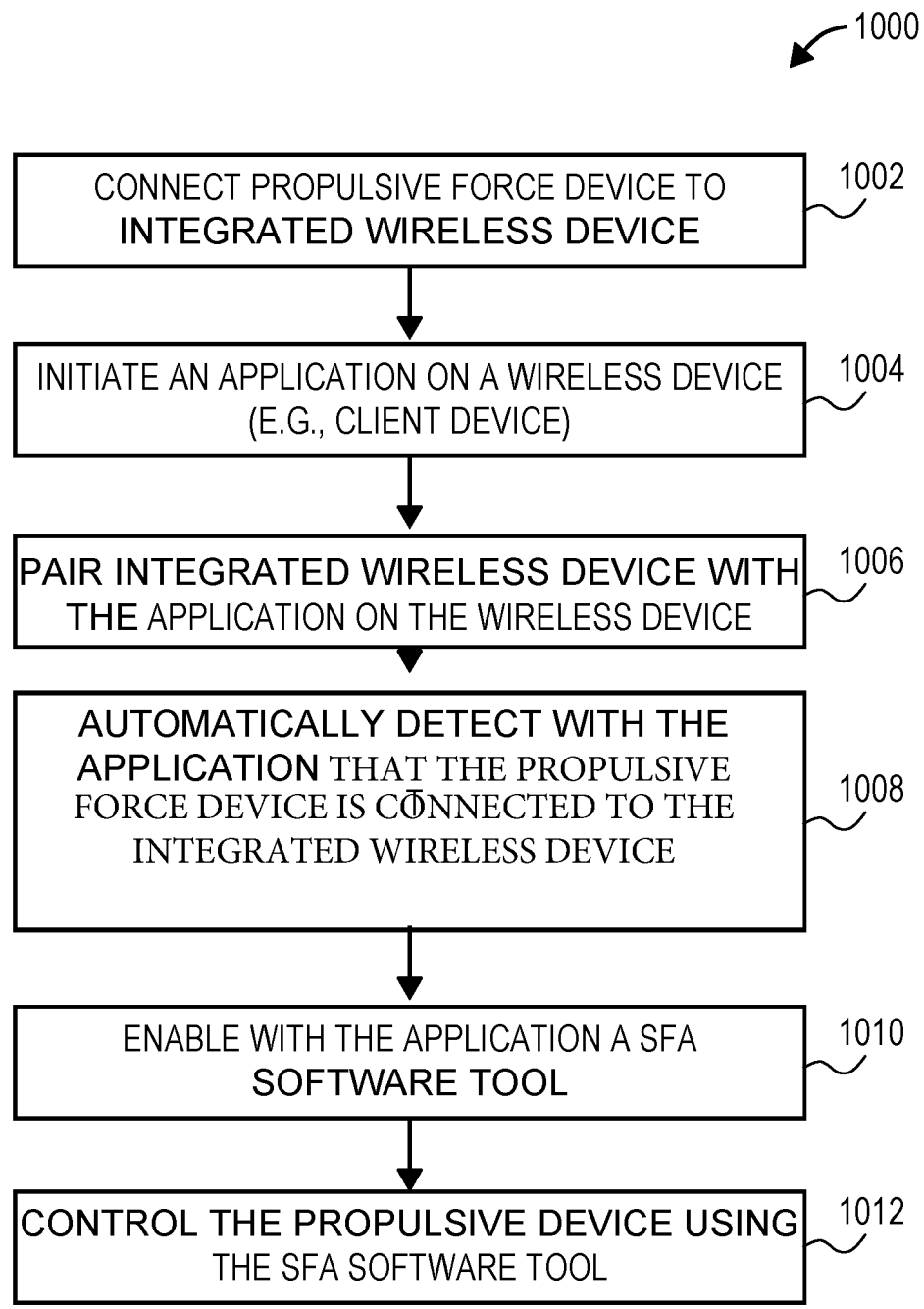
FIG. 10 illustrates a flow diagram of one embodiment for a method 1000 of pairing a propulsive force device (e.g., SFA) that is mounted to an integrated wireless device with application software of a client device.

FIG. 10 illustrates a flow diagram of one embodiment for a method 1000 of pairing a propulsive force device (e.g., SFA) that is connected to an integrated wireless device with application software of a wireless device (e.g., client device). The method 1000 is performed by processing logic that may comprise hardware (circuitry, dedicated logic, etc.), software (such as is run on a general purpose computer system or a dedicated machine or a device), or a combination of both. In one embodiment, the method 100 is performed by processing logic of at least one wireless device (e.g., computing devices, tablets, laptops, notebook devices, mobile devices, etc.) that communicates with the integrated wireless device (e.g., Smart Cart, vehicle, levitating device, drone, self-guided device, self-propelled device, etc). The wireless device executes instructions of a software application or program with processing logic. In one example, the wireless device performs some or all of the operations of the method 1000.

At operation 1002, the method includes connecting the propulsive force device with the integrated wireless device. At operation 1004, the method includes initiating a science software application on a wireless device (e.g., computing devices, tablets, laptops, notebook devices, mobile devices, etc.). At operation 1006, the method further includes pairing the integrated wireless device with the science software application on the wireless device. At operation 1008, the method further includes automatically detecting with the science software application that the propulsive force device is connected to the integrated wireless device. At operation 1010, the method further includes enabling a SFA software tool with the science software application. At operation 1012, the method further includes controlling the propulsive force device (e.g., SFA) with the software tool that provides additional features of the science software application.

Figure 11:
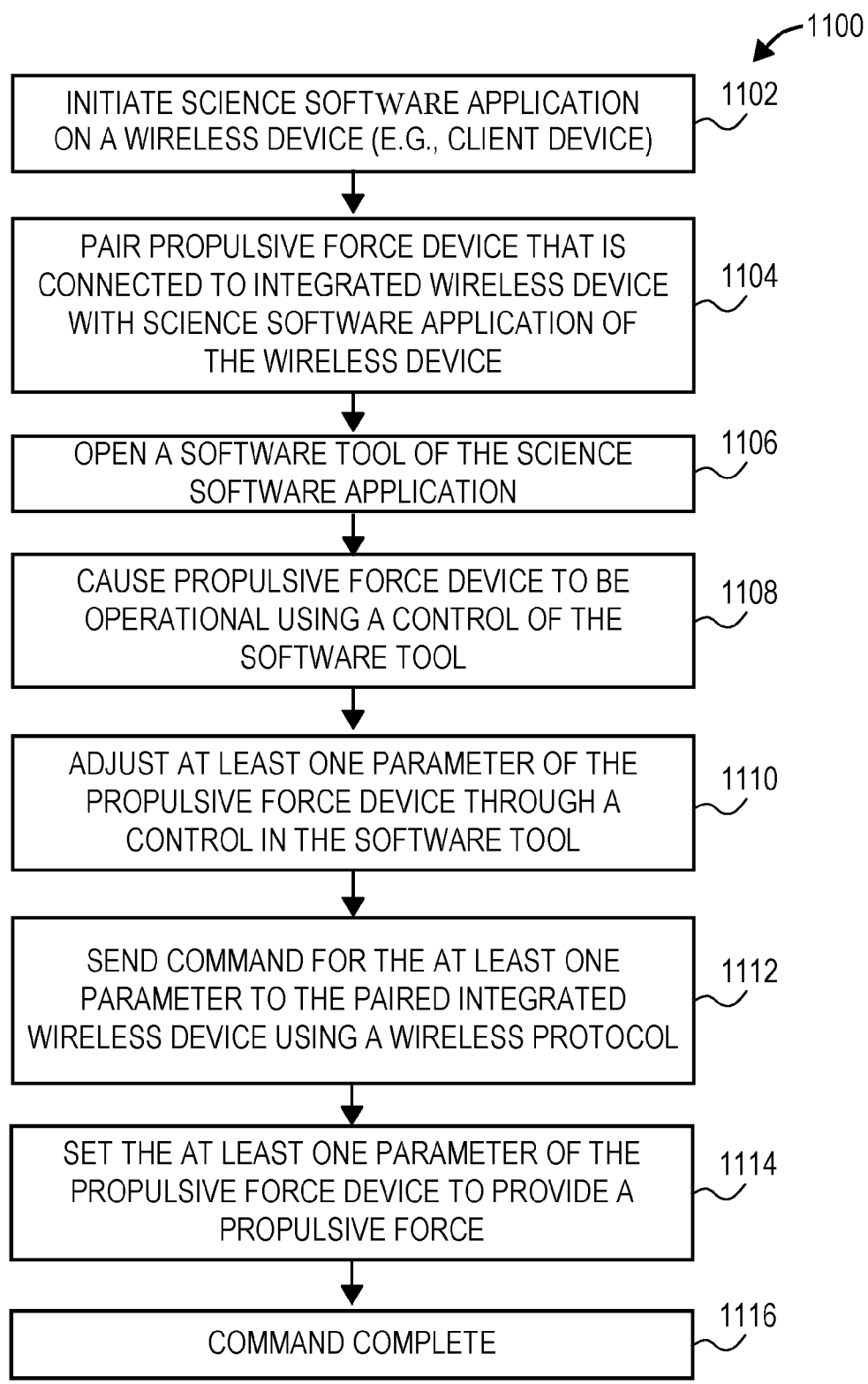
FIG. 11 illustrates a flow diagram of one embodiment for a method 1100 of open loop control of a propulsive force device (e.g., SFA) with application software of a wireless device (e.g., client device).

FIG. 11 illustrates a flow diagram of one embodiment for a method 1100 of open loop control of a propulsive force device (e.g., SFA) with application software of a wireless device (e.g., client device). The method 1100 is performed by processing logic that may comprise hardware (circuitry, dedicated logic, etc.), software (such as is run on a general purpose computer system or a dedicated machine or a device), or a combination of both. In one embodiment, the method 1100 is performed by processing logic of at least one wireless device (e.g., computing devices, tablets, laptops, notebook devices, mobile devices, etc.) that communicates with the integrated wireless device (e.g., Smart Cart, vehicle, levitating device, drone, self-guided device, self-propelled device, etc). The wireless device executes instructions of a software application or program with processing logic. In one example, the wireless device, integrated wireless device, and/or propulsive force device performs some or all of the operations of the method 1100.

At operation 1102, the method includes initiating a science software application on a wireless device (e.g., computing devices, tablets, laptops, notebook devices, mobile devices, etc.) for a science experiment. At operation 1104, the method further includes pairing a propulsive force device (e.g., SFA) that is connected to an integrated wireless device with the science software application of a wireless device (e.g., client device). The operations of method 1000 can be performed at operation 1104. At operation 1106, the method further includes opening a SFA software tool with the science software application. At operation 1108, the method further includes causing the propulsive force device (e.g., SFA) to be operational using a control of the SFA software tool that provides additional features of the science software application.

At operation 1110, the method further includes adjusting parameters (e.g., force, speed, direction) of the propulsive force device using a control of the software tool. The user can select at least one adjustable parameter using a control of the software tool. At operation 1112, the method further includes sending a command(s) for the at least one adjusted parameter from the wireless device (e.g., client wireless device) to the paired integrated wireless device. At operation 1114, the method further includes setting the at least one adjusted parameter of the propulsive force device to cause the propulsive force device to provide a propulsive force in a particular direction. This operation 1114 is described in more detail in conjunction with the description of method 1200. At operation 1116, the command for the propulsive force device completes.

Figure 12:
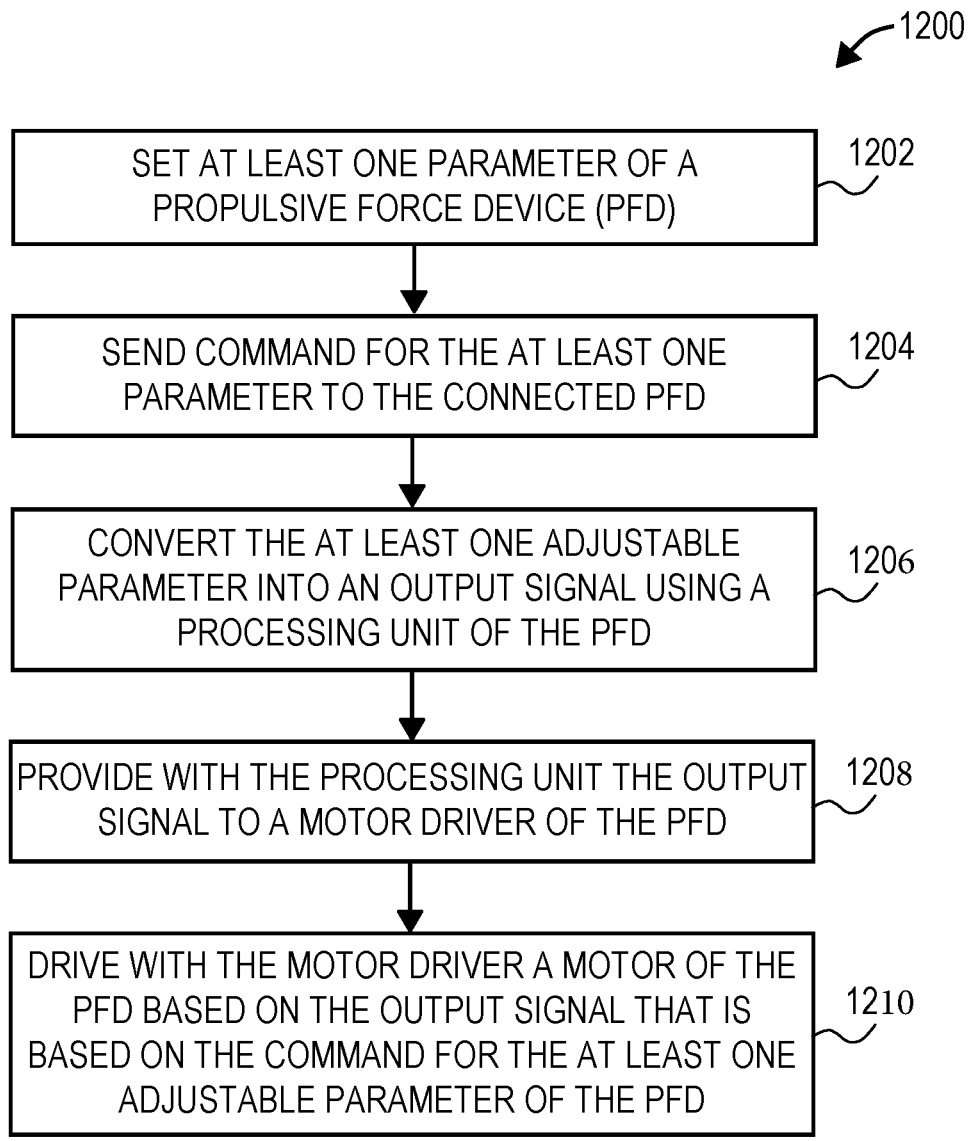
FIG. 12 illustrates a flow diagram of one embodiment for a method 1200 of setting at least one adjustable parameter of a propulsive force device to cause the propulsive force device to provide a propulsive force in a particular direction.

FIG. 12 illustrates a flow diagram of one embodiment for a method 1200 of setting at least one adjustable parameter of a propulsive force device to cause the propulsive force device to provide a propulsive force in a particular direction. The method 1200 is performed by processing logic that may comprise hardware (circuitry, dedicated logic, etc.), software (such as is run on a general purpose computer system or a dedicated machine or a device), or a combination of both. In one embodiment, the method 1200 is performed by processing logic of the integrated wireless device (e.g., Smart Cart, vehicle, levitating device, drone, self-guided device, self-propelled device, etc) that communicates with the propulsive force device. The integrated wireless device executes instructions of a software application or program with processing logic. In one example, the integrated wireless device, and/or propulsive force device performs some or all of the operations of the method 1200.

At operation 1202, the method includes setting at least one adjustable parameter of the propulsive force device (PFD). At operation 1204, the method further includes sending a command(s) for the at least one adjustable parameter from the integrated wireless device to the PFD. In one example, a cable connects the integrated wireless device to the PFD. At operation 1206, the method further includes converting the at least one adjustable parameter into an output signal (e.g., pulse width modulation output signal) using a processing unit (e.g., microcontroller) of the PFD. At operation 1208, the method further includes providing, with the processing unit, the output signal to a motor driver (e.g., motor controller) of the PFD.

At operation 1210, the method further includes driving, with the motor driver, a motor of the PFD based on the output signal that is based on the command for the at least one adjustable parameter (e.g., force, speed, direction) of the propulsive force device.

Figure 13:
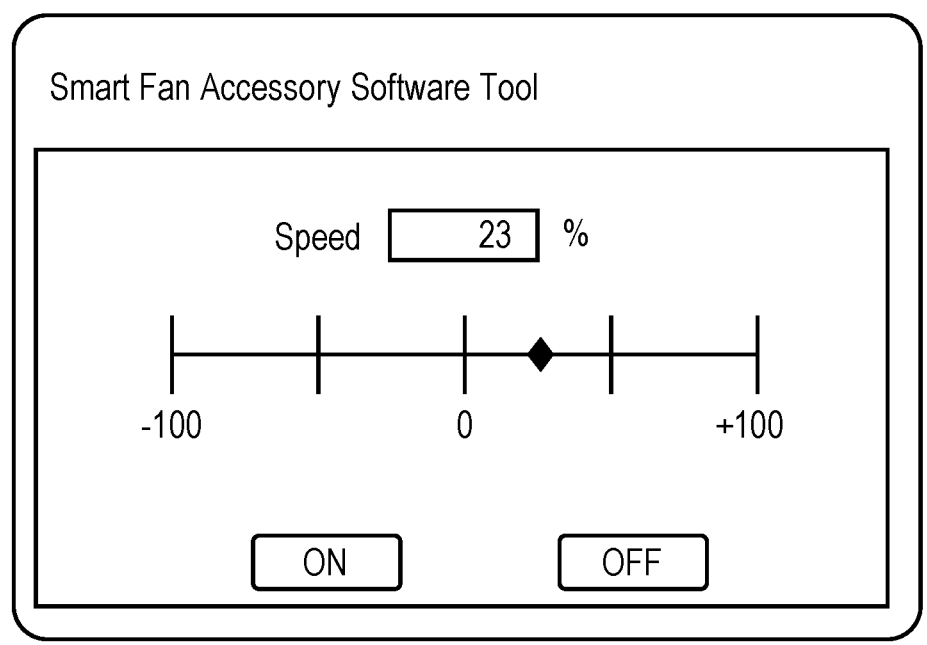
FIG. 13 illustrates a user interface for open loop control of the propulsive force device in accordance with one embodiment.

FIG. 13 illustrates a user interface for open loop control of the propulsive force device in accordance with one embodiment. This user interface 1300 allows a user to set a parameter (e.g., speed, direction) for the propulsive force device in accordance with operation 1110 of method 1100.

Figure 14:
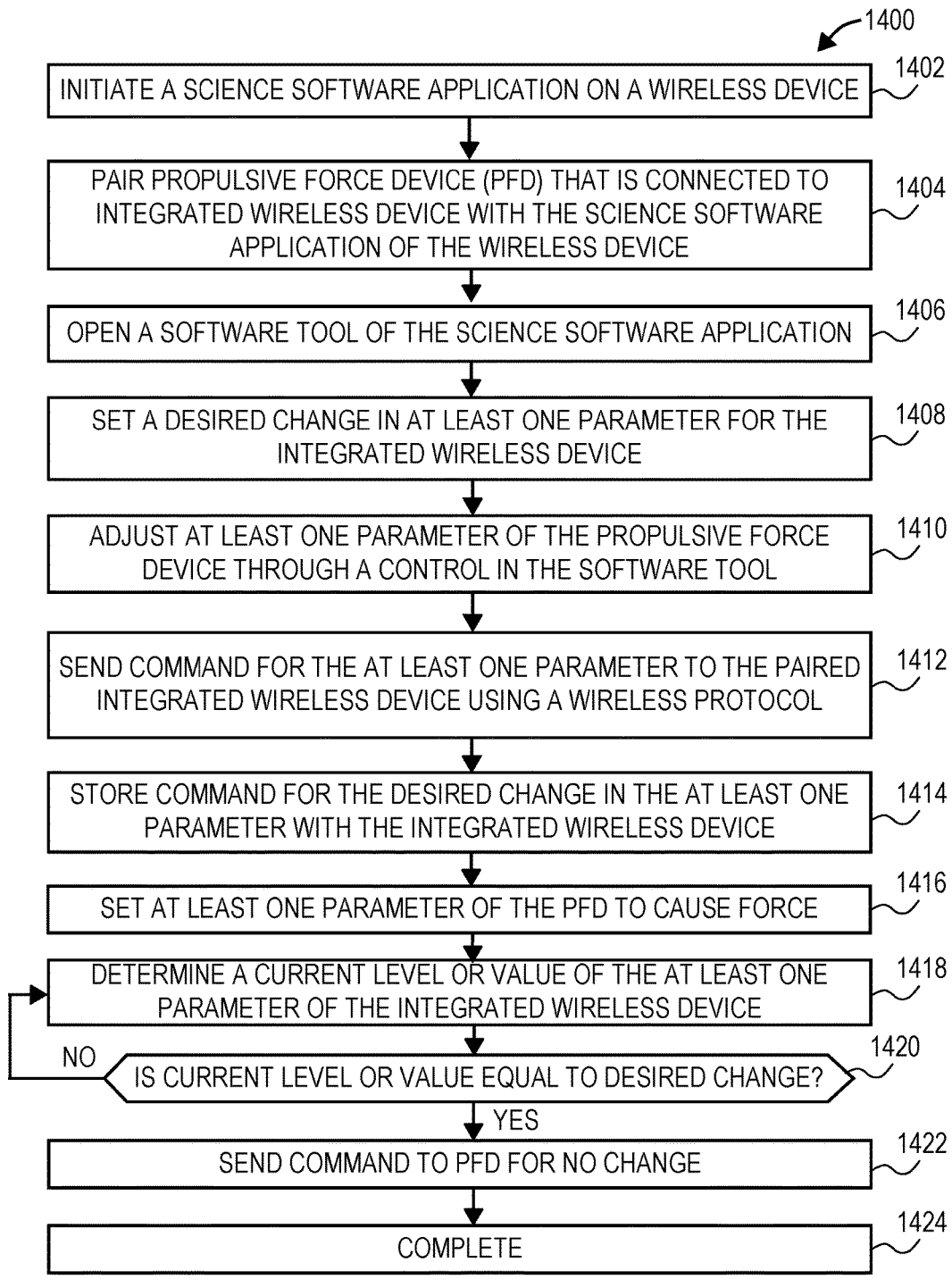
FIG. 14 illustrates a flow diagram of one embodiment for a method 1400 of closed loop control of a propulsive force device (e.g., SFA) with application software of a wireless device (e.g., client device).

FIG. 14 illustrates a flow diagram of one embodiment for a method 1400 of closed loop control of a propulsive force device (e.g., SFA) with application software of a wireless device (e.g., client device). The method 1400 is performed by processing logic that may comprise hardware (circuitry, dedicated logic, etc.), software (such as is run on a general purpose computer system or a dedicated machine or a device), or a combination of both. In one embodiment, the method 1400 is performed by processing logic of at least one wireless device (e.g., computing devices, tablets, laptops, notebook devices, mobile devices, etc.) that communicates with the integrated wireless device (e.g., Smart Cart, vehicle, levitating device, drone, self-guided device, self-propelled device, etc). The wireless device executes instructions of a software application or program with processing logic. In one example, the wireless device, integrated wireless device, and/or propulsive force device performs some or all of the operations of the method 1400.

At operation 1402, the method includes initiating a science software application on a wireless device (e.g., computing devices, tablets, laptops, notebook devices, mobile devices, etc.) for a science experiment. At operation 1404, the method further includes automatically detecting that a propulsive force is connected to the integrated wireless device and pairing the propulsive force device (e.g., SFA) to the integrated wireless device with the science software application of the wireless device (e.g., client device). The operations of method 1000 can be performed at operation 1404. At operation 1406, the method further includes opening a SFA software tool with the science software application. At operation 1408, the method further includes setting a desired change in at least one parameter for the integrated wireless device. In one example, a user sets a desired positional change for the integrated wireless device. In another example, a user sets a desired change in force for the integrated wireless device. In another example, a user sets a desired change in acceleration for the integrated wireless device.

At operation 1410, the method further includes causing the propulsive force device (e.g., SFA) to be operational using a control of the SFA software tool that provides additional features of the science software application.

At operation 1412, the method further includes sending a command(s) for the at least one desired parameter from the wireless device (e.g., client wireless device) to the paired integrated wireless device. At operation 1414, the method further includes storing the command(s) for the at least one desired parameter with the integrated wireless device. At operation 1416, the method further includes setting at least one parameter of the propulsive force device (PFD) to cause the propulsive force device to provide a propulsive force in a particular direction to provide the desired change in at least one parameter of the integrated wireless device. In one example, a speed and direction of the propulsive force device are set to provide the desired change in at least one parameter of the integrated wireless device.

At operation 1418, the method further includes determining a current level or value of the at least one parameter of the integrated wireless device. At operation 1420, the method further includes determining whether the current level or value of the at least one parameter of the integrated wireless device is approximately equal to the desired change in the at least one parameter (e.g., commanded parameter level, commanded parameter value). If so, then the method further includes sending a command from the integrated wireless device to the propulsive force device for no change. In one example, the command indicates zero speed for the propulsive force device. The method completes at operation 1424.

If the current level or value for the at least one parameter of the integrated wireless device is not approximately equal to the desired change in the at least one parameter at operation 1420, then method returns to operation 1418.

The propulsive force device can be controlled using sensor input in multiple ways. In one example, the PFD is operational or not operational based on a sensor measurement. In another example, a more controlled response allows a speed of a fan of the PFD to be adjusted in proportion to a measurement. The following are some examples of different embodiments.

In one embodiment for position control, by using the position of the integrated wireless device as measured by an onboard optical encoder of the integrated wireless device, the position of the cart can be maintained. Upon Displacing the integrated wireless device in either direction from its equilibrium position, and the fan powers up and returns the integrated wireless device to its original equilibrium position.

In another embodiment for speed control, measurements from the optical encoder can also be used to control the speed of the integrated wireless device. A typical use would be to move the integrated wireless device along a track at a constant speed, then reverse fan thrust to stop the integrated wireless device at the end of the track. This exercise might also include measurements from the onboard acceleration chips, controlling the acceleration and deceleration of the cart.

In another embodiment with a force sensor, the integrated wireless device (e.g., Smart Cart) is tethered using a spring or string tied to the built-in force sensor, the PFD can be used to apply a pre-determined amount of force. This could even be ramped, to give a continuously varying force.

The science software application can be configured to use sensor values from the Smart Cart, including position, force, and acceleration, to automatically vary force or direction. In this mode, the motion of the Smart Cart (with attached SFA) can be programmed to study closed-loop control of motion.

Figure 15:
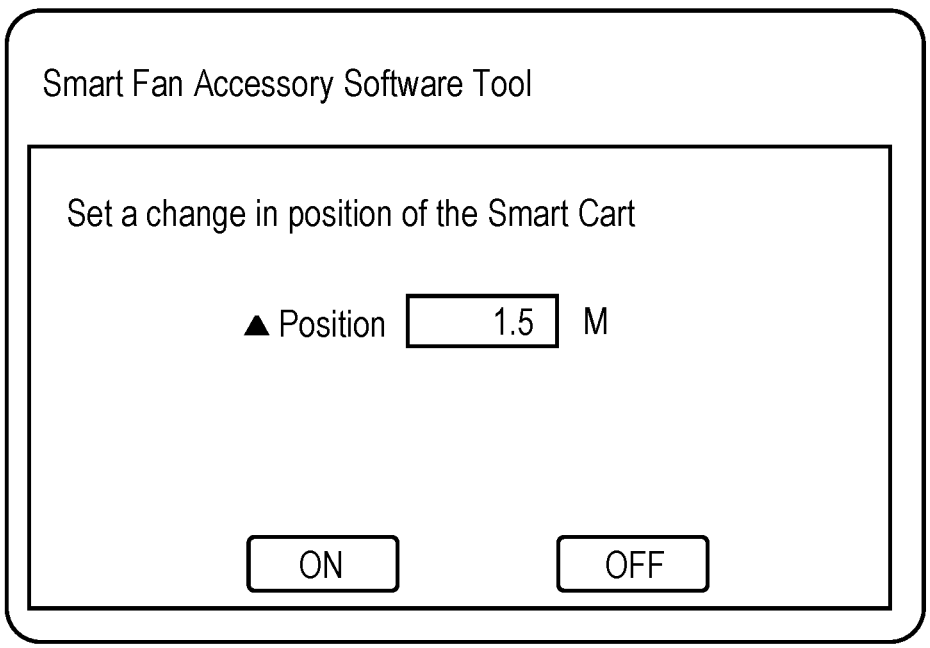
FIG. 15 illustrates a user interface for closed loop control of the propulsive force device in accordance with one embodiment.

FIG. 15 illustrates a user interface for closed loop control of the propulsive force device in accordance with one embodiment. This user interface 1500 allows a user to set a desired change in a parameter (e.g., position, force, acceleration) for the integrated wireless device in accordance with operation 1408 of method 1400.

Figure 16:
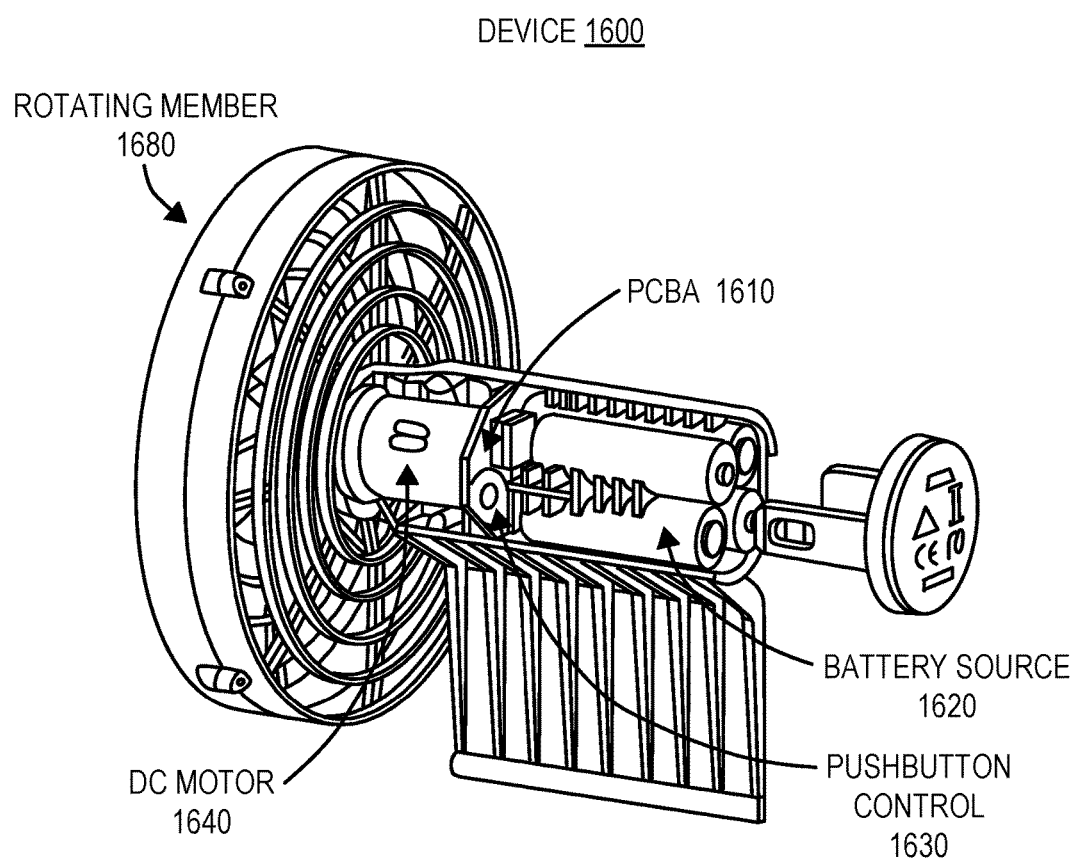
FIG. 16 illustrates a perspective view of a propulsive force device in accordance with one embodiment.

FIG. 16 illustrates a perspective view of a propulsive force device in accordance with one embodiment. The propulsive force device 1600 includes a printed circuit board assembly (PCBA) 1610 that includes a processing unit (e.g., CPU), a motor driver, and power supplies. The device also includes a battery source 1620, a push button control 1630, and a DC motor 1640 to drive a rotating member 1680 to generate a propulsive force.

The device includes a second mode of operation in which manual control is provided by the push button control 1630 for the device 1600 being mounted on a Dynamics Cart. A push button control 1630 turns on and off a rotating member (e.g., a fan). In one example, multiple speeds (e.g., three speeds) are available and chosen by quick button pushes. A direction is controlled based on an orientation of the rotating member with respect to the cart.

In one example, the device 1600 is powered by four AA batteries, either Alkaline or rechargeable NiMH. On full speed, the device 1600 can create a thrust of 0.2 Newtons for a particular design.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A propulsive force device for providing a propulsive force to an integrated wireless device during a science experiment, comprising:
   a motor to drive a rotating member to generate the propulsive force;
   a motor driver coupled to the motor, the motor driver to control operation of the motor; and
   at least one processing unit communicatively coupled to the motor driver, the at least one processing unit is configured to receive a control signal from the integrated wireless device, the propulsive force device detachably attached to an exterior of the integrated wireless device and communicatively coupled with a second processing unit of the integrated wireless device, the control signal generated by the second processing unit of the integrated wireless device and communicated to the at least one processing unit to provide the control signal to the motor driver to control operation of the motor driver including adjustment of the at least one parameter of the propulsive force device during the science experiment.

2. The propulsive force device of claim 1, wherein the integrated wireless device is remotely controlled by a wireless device that provides a command to the integrated wireless device for adjusting the at least one parameter of the propulsive force device.

3. The propulsive force device of claim 1, wherein the command adjusts a speed and a direction of the rotating member of the propulsive force device from the wireless device that is remotely located with respect to the propulsive force device.

4. The propulsive force device of claim 1, further comprising:
a port coupled to the at least one processing unit, the port to communicatively couple the second processing unit of the integrated wireless device to the at least one processing unit of the propulsive force device when the propulsive force device is attached to the integrated wireless device.

5. The propulsive force device of claim 1, further comprising:
a manual control option coupled to the at least one processing unit, the manual control option to allow manual control of a speed setting of the rotating member.

6. An integrated wireless device for use in performing a science experiment, comprising:
a motion device to generate motion data based on detecting a current rate of motion of the integrated wireless device;
an accessory port;
a propulsive force device coupled to the accessory port of the integrated wireless device, wherein the propulsive force device becomes operational using a control of a software tool of a science software application of a remote wireless device, and wherein the propulsive force device is detachably attached to an exterior of the integrated wireless device; and
at least one processing unit coupled to the motion device and the accessory port, the at least one processing unit is configured to receive from the remote wireless device a command for a desired change in at least one parameter for the integrated wireless device and generate a control signal responsive to the command, wherein the control signal is communicated from the at least one processing unit to the propulsive force device to control operation of the propulsive force device to make the desired change in the at least one parameter during the science experiment.

7. The integrated wireless device of claim 6, wherein at least one parameter of the propulsive force device (PFD) is set by the control signal to cause the propulsive force device to provide a propulsive force in a particular direction to provide the desired change in the at least one parameter of the integrated wireless device.

8. The integrated wireless device of claim 7, wherein the at least one parameter of the PFD comprises a speed and direction of the PFD to provide the desired change in the at least one parameter of the integrated wireless device.

9. The integrated wireless device of claim 6, wherein the at least one processing unit is configured to determine a current level or value of the at least one parameter of the integrated wireless device and to determine whether the current level or value of the at least one parameter of the integrated wireless device is approximately equal to the desired change in the at least one parameter.

10. The integrated wireless device of claim 6, wherein the motion data comprises positional information that indicates a position of the integrated wireless device with the position of the device automatically being maintained if desired even in the presence of displacing the integrated wireless device in either direction from its equilibrium position due to a rotating member of the propulsive force device powering up and returning the integrated wireless device to the equilibrium position.

11. The propulsive force device of claim 1, wherein the propulsive force device is a fan accessory that detachably attaches to the exterior of the integrated wireless device, and is communicatively coupled with the integrated wireless device via an accessory port, prior to the performance of the science experiment.

* * * * *